(12) United States Patent
Yuan et al.

(10) Patent No.: US 9,899,904 B2
(45) Date of Patent: Feb. 20, 2018

(54) DC-DC POWER SUPPLY CONTROL CIRCUIT AND ELECTRONIC DEVICE

(71) Applicant: STREAMAX TECHNOLOGY CO., LTD., Shenzhen (CN)

(72) Inventors: Geng Yuan, Shenzhen (CN); Mancheng Xiao, Shenzhen (CN); Mingyang Liu, Shenzhen (CN)

(73) Assignee: STREAMAX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/323,866

(22) PCT Filed: Feb. 18, 2016

(86) PCT No.: PCT/CN2016/074048
§ 371 (c)(1),
(2) Date: Jan. 4, 2017

(87) PCT Pub. No.: WO2017/139953
PCT Pub. Date: Aug. 24, 2017

(65) Prior Publication Data
US 2018/0019659 A1      Jan. 18, 2018

(51) Int. Cl.
*H02M 1/14*      (2006.01)
*H02M 3/156*     (2006.01)

(52) U.S. Cl.
CPC ............. *H02M 1/14* (2013.01); *H02M 3/156* (2013.01)

(58) Field of Classification Search
CPC ..................... H02M 1/14; H02M 1/36; H02M 3/155–3/1588
See application file for complete search history.

(56) References Cited

U.S. PATENT DOCUMENTS 3,740,668 A * 6/1973 Chopra ............... H02M 3/1563
                                                331/113 R
3,959,716 A * 5/1976 Gilbert, Jr. ................ G05F 5/00
                                                323/288
(Continued)

FOREIGN PATENT DOCUMENTS

CN      1725616 A      1/2006
CN      1797885 A      7/2006
(Continued)

OTHER PUBLICATIONS

International Search Report (PCT/ISA/210) dated Jul. 6, 2016, by the State Intellectual Property Office of People's Republic of China Patent Office as the International Searching Authority for International Application No. PCT/CN2016/074048.
(Continued)

*Primary Examiner* — Yusef Ahmed
(74) *Attorney, Agent, or Firm* — Buchanan Ingersoll & Rooney PC

(57) ABSTRACT

A DC-DC power supply control circuit includes: a voltage stabilizing diode, a first resistor, a second resistor, a third resistor, a first triode and a second triode. Two ends of the first resistor are connected with an input end and an enable end of the DC-DC power supply respectively. Two ends of the second resistor are connected with the enable end and a collector of the second triode. A base electrode and an emitting electrode of the second triode are connected with a collector of the first triode and ground respectively. A negative electrode end and a positive electrode end of the voltage stabilizing diode are connected with an output end of the DC-DC power supply and a base electrode of the first triode respectively. Two ends of the third resistor are connected with the base electrode and the ground respectively. An emitting electrode of the first triode is grounded.

8 Claims, 1 Drawing Sheet

(56) References Cited

U.S. PATENT DOCUMENTS

| | | | | |
|---|---|---|---|---|
| 4,041,546 A * | 8/1977 | Stewart | H01H 47/325 | 361/152 |
| 4,218,730 A * | 8/1980 | Marumoto | H02M 3/156 | 318/722 |
| 4,859,927 A * | 8/1989 | Meijer | H02M 3/155 | 323/284 |
| 5,341,085 A * | 8/1994 | Ettes | H02M 3/156 | 323/222 |
| 5,726,875 A * | 3/1998 | Hirabayashi | H02M 3/1563 | 323/274 |
| 5,757,629 A * | 5/1998 | Yntema | H02M 3/1563 | 363/131 |
| 6,239,585 B1 * | 5/2001 | Buono | H02M 3/1563 | 323/282 |
| 2006/0138545 A1 | 6/2006 | Kuo | | |
| 2010/0102789 A1 * | 4/2010 | Randall | H02M 3/1563 | 323/282 |
| 2014/0015504 A1 * | 1/2014 | Sano | G05F 3/30 | 323/282 |
| 2014/0177296 A1 * | 6/2014 | Mi | H02M 1/36 | 363/49 |
| 2014/0192564 A1 * | 7/2014 | Tang | H02M 3/33523 | 363/21.14 |
| 2015/0145496 A1 | 5/2015 | Louvel | | |

FOREIGN PATENT DOCUMENTS

| | | |
|---|---|---|
| CN | 102594170 A | 7/2012 |
| CN | 103227559 A | 7/2013 |
| CN | 204794681 U | 11/2015 |
| JP | 2010063304 A | 3/2010 |

OTHER PUBLICATIONS

Written Opinion (PCT/ISA/237) dated Jul. 6, 2016, by the State Intellectual Property Office of People's Republic of China Patent Office as the International Searching Authority for International Application No. PCT/CN2016/074048.

* cited by examiner

DC-DC POWER SUPPLY CONTROL CIRCUIT AND ELECTRONIC DEVICE

TECHNICAL FIELD

The present disclosure relates to the field of electronic device technologies, and more particularly, to a DC-DC power supply control circuit and an electronic device.

BACKGROUND

With the development of science and technology, there are more and more types of electronic devices, whose functions are more and more powerful.

At present, electronic devices adopting direct current supply in the market mainly use DC-DC power supplies ("DC" is short for direct current) to supply power. If voltage outputted by a DC-DC power supply jitters, this will make a load circuit work improperly or even damage a load circuit. For example, in many in-vehicle electronic devices, due to existence of a super-capacitor of an input end of a DC-DC power supply, following cases will be present in the process of power failure of the DC-DC power supply: a voltage across the super-capacitor of the DC-DC power supply decreases, the DC-DC power supply is turned off when the voltage across the super-capacitor is smaller than the minimum working voltage of the DC-DC power supply, the voltage across the super-capacitor may be rebounded after the DC-DC power supply is turned off; and the DC-DC power supply is turned on again when the voltage across the super-capacitor is rebounded to the minimum working voltage of the DC-DC power supply. A load is increased after the DC-DC power supply is turned on, which makes the voltage across the super-capacitor drop to be less than the minimum working voltage of the DC-DC power supply again, thereby causing the DC-DC power supply to be turned off again, the voltage across the super-capacitor is rebounded again after the DC-DC power supply is turned off; and the DC-DC power supply is turned on again when the voltage across the super-capacitor is rebounded to the minimum working voltage of the DC-DC power supply. It is repeated many times in this way. In the above process, the output voltage will fluctuate since the DC-DC power supply is repeatedly turned on and turned off, which has a great negative effect on the load.

At present, no related technical solution can effectively solve the problem of repeated turn-on or turn-off of the DC-DC power supply caused by fluctuation of the input voltage of the DC-DC power supply in the vicinity of the minimum working voltage of the DC-DC power supply.

SUMMARY

The present disclosure provides a DC-DC power supply control circuit and an electronic device to achieve a low-voltage automatic switch-off protection of the DC-DC power supply.

In a first aspect, the present disclosure provides a DC-DC power supply control circuit, including:

a voltage stabilizing diode, a first resistor, a second resistor, a third resistor, a first triode and a second triode; where one end of the first resistor is connected with an input end of the DC-DC power supply, and another end of the first resistor is connected with an enable end of the DC-DC power supply;

one end of the second resistor is connected with the enable end of the DC-DC power supply, and another end of the second resistor is connected with a collector of the second triode;

a base electrode of the second triode is connected with a collector of the first triode, and an emitting electrode of the second triode is grounded;

a negative electrode end of the voltage stabilizing diode is connected with an output end of the DC-DC power supply, and a positive electrode end of the voltage stabilizing diode is connected with a base electrode of the first triode;

one end of the third resistor is connected with the base electrode of the first triode, and another end of the third resistor is grounded;

an emitting electrode of the first triode is grounded; and resistance values of the first resistor and the second resistor meet following conditions:

$$V_{inmin} * \left(\frac{R_2}{R_1 + R_2}\right) \leq V_{en};$$

$$V_{innormal} * \left(\frac{R_2}{R_1 + R_2}\right) \geq V_{en};$$

where $V_{inmin}$ denotes a minimum working voltage of the DC-DC power supply, $V_{innormal}$ denotes a normal working voltage of the DC-DC power supply, $V_{en}$ denotes a turn-on voltage of the enable end of the DC-DC power supply, $R_1$ denotes a resistance value of the first resistor, and $R_2$ denotes a resistance value of the second resistor.

Based on the first aspect of the present disclosure, in a first possible implementation manner, the first resistor and the second resistor specifically are slide rheostats.

Based on the first aspect of the present disclosure, in a second possible implementation manner, the first resistor and the second resistor specifically are resistors having fixed resistance values.

Based on the first aspect of the present disclosure or the first possible implementation manner of the first aspect of the present disclosure or the second possible implementation manner of the first aspect of the present disclosure, in a third possible implementation manner, a model of the DC-DC power supply specifically is MP2315.

In a second aspect, the present disclosure provides a DC-DC power supply control circuit, including:

a voltage stabilizing diode, a first resistor, a second resistor, a third resistor, a first field effect transistor and a second field effect transistor; where one end of the first resistor is connected with an input end of the DC-DC power supply, and another end of the first resistor is connected with an enable end of the DC-DC power supply;

one end of the second resistor is connected with the enable end of the DC-DC power supply, and another end of the second resistor is connected with a drain electrode of the second field effect transistor;

a gate electrode of the second field effect transistor is connected with a drain electrode of the first field effect transistor, and a source electrode of the second field effect transistor is grounded;

a negative electrode end of the voltage stabilizing diode is connected with an output end of the DC-DC power supply, and a positive electrode end of the voltage stabilizing diode is connected with a gate electrode of the first field effect transistor;

one end of the third resistor is connected with the gate electrode of the first field effect transistor, and another end of the third resistor is grounded;

a source electrode of the first field effect transistor is grounded; and resistance values of the first resistor and the second resistor meet following conditions:

$$V_{inmin} * \left(\frac{R_2}{R_1 + R_2}\right) \leq V_{en};$$

and $$V_{innormal} * \left(\frac{R_2}{R_1 + R_2}\right) \geq V_{en};$$

where $V_{inmin}$ denotes a minimum working voltage of the DC-DC power supply, $V_{innormal}$ denotes a normal working voltage of the DC-DC power supply, $V_{en}$ denotes a turn-on voltage of the enable end of the DC-DC power supply, $R_1$ denotes a resistance value of the first resistor, and $R_2$ denotes a resistance value of the second resistor.

Based on the second aspect of the present disclosure, in a first possible implementation manner, the first resistor and the second resistor specifically are slide rheostats.

Based on the second aspect of the present disclosure, in a second possible implementation manner, the first resistor and the second resistor specifically are resistors having fixed resistance values.

Based on the second aspect of the present disclosure or the first possible implementation manner of the first aspect of the present disclosure or the second possible implementation manner of the first aspect of the present disclosure, in a third possible implementation manner, a model of the DC-DC power supply specifically is MP2315.

In a third aspect, the present disclosure provides an electronic device, including a DC-DC power supply control circuit, where the DC-DC power supply control circuit is any DC-DC power supply control circuit as mentioned in the first aspect of the present disclosure; or the DC-DC power supply control circuit is any DC-DC power supply control circuit as mentioned in the second aspect of the present disclosure.

As can be seen from the above, in the present disclosure, a voltage stabilizing diode, resistors and triodes (or field effect transistors) are employed to construct a DC-DC power supply control circuit, and an input voltage of an enable end of a DC-DC power supply is changed through turn-on or turn-off of the triodes (or the field effect transistors). In this way, a low-voltage automatic switch-off protection of the DC-DC power supply is achieved, thereby solving a problem of repeated turn-on or turn-off of the DC-DC power supply caused by fluctuation of the input voltage of the DC-DC power supply in the vicinity of a minimum working voltage of the DC-DC power supply.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION OF THE PREFERRED EMBODIMENTS

To make the objectives, features and advantages of the present disclosure more apparent and transparent, the following will clearly and completely describe the technical solution in embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Embodiment I

Figure 1:
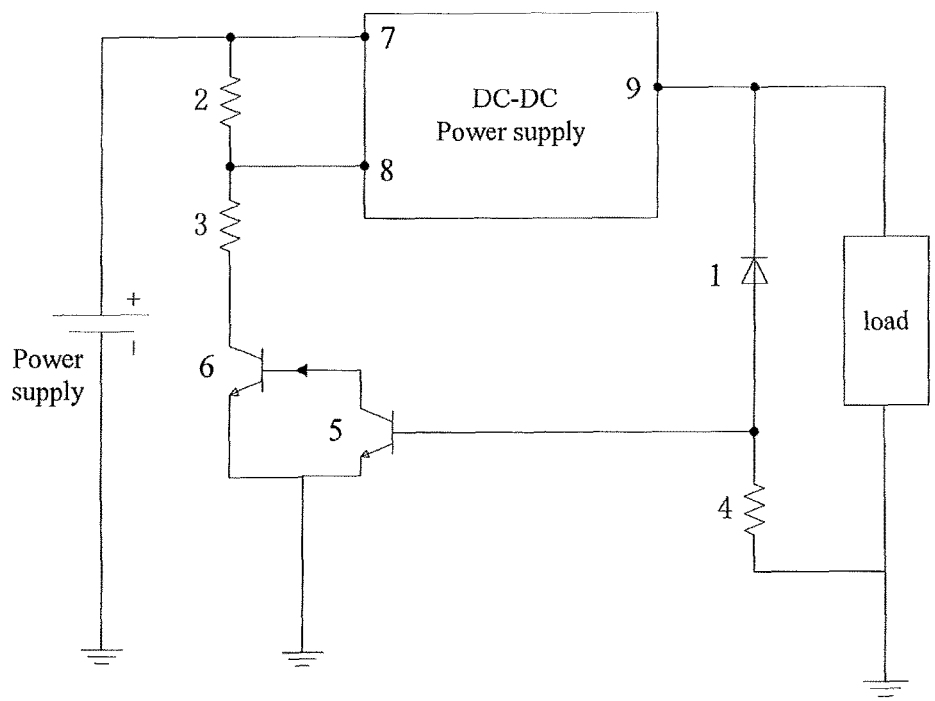
FIG. 1 is a schematic structural diagram of a DC-DC power supply control circuit according to one embodiment of the present disclosure.

The embodiment of the present disclosure provides a DC-DC power supply control circuit, referring to FIG. 1, the DC-DC power supply control circuit in the embodiment of the present disclosure includes:

a voltage stabilizing diode 1, a first resistor 2, a second resistor 3, a third resistor 4, a first triode 5 and a second triode 6; where one end of the first resistor 2 is connected with an input end 7 of the DC-DC power supply, and another end of the first resistor 2 is connected with an enable end 8 of the DC-DC power supply;

one end of the second resistor 3 is connected with the enable end 8 of the DC-DC power supply, and another end of the second resistor 3 is connected with a collector of the second triode 6;

a base electrode of the second triode 6 is connected with a collector of the first triode 5, and an emitting electrode of the second triode 6 is grounded;

a negative electrode end of the voltage stabilizing diode 1 is connected with an output end 9 of the DC-DC power supply, and a positive electrode end of the voltage stabilizing diode 1 is connected with a base electrode of the first triode 5;

one end of the third resistor 4 is connected with the base electrode of the first triode 5, and another end of the third resistor 4 is grounded;

an emitting electrode of the first triode 5 is grounded; and resistance values of the first resistor 2 and the second resistor 3 meet following conditions:

$$V_{inmin} * \left(\frac{R_2}{R_1 + R_2}\right) \leq V_{en}$$

(described as a first formula hereinafter for the convenience of description); and $$V_{innormal} * \left(\frac{R_2}{R_1 + R_2}\right) \geq V_{en}$$

(described as a second formula hereinafter for the convenience of description); where $V_{inmin}$ denotes a minimum working voltage of the DC-DC power supply, $V_{innormal}$ denotes a normal working voltage of the DC-DC power supply, $V_{en}$ denotes a turn-on voltage of the enable end 8 of the DC-DC power supply, $R_1$ denotes a resistance value of the first resistor 2, and $R_2$ denotes a resistance value of the second resistor 3.

As shown in FIG. 1, a power supply is connected with the input end 7 of the DC-DC power supply to supply an input voltage for the DC-DC power supply, and a load is connected with the output end 9 of the DC-DC power supply so that the load is power-supplied by the DC-DC power supply.

Optionally, the first resistor 2 and the second resistor 3 specifically are slide rheostats. Of course, the first resistor 2 and the second resistor 3 also may be resistors having fixed resistance values meeting the first formula and the second formula, which are not limited herein.

Optionally, a resistance range of the third resistor is 10 Ohms~10,000 Ohms. Specifically, the resistance value of the third resistor also may be set up according to the actual situation, which is not limited herein.

Optionally, the model of the DC-DC power supply in the embodiment of the present disclosure specifically is MP2315. Of course, the DC-DC power supply control circuit in the embodiment of the present disclosure may also be applied to other DC-DC power supplies having enable ends, which is not limited herein.

A concrete implementation process of the DC-DC power supply control circuit in the embodiment of the present disclosure is described with reference to FIG. 1 as below: when the voltage of the output end 9 of the DC-DC power supply is normal, the voltage stabilizing diode 1 is turned on, allowing the first triode 5 to be turned on and the second triode 6 to be turned off, at the moment the voltage of the enable end 8 of the DC-DC power supply is equal to that of the input end 7 of the DC-DC power supply, and the DC-DC power supply maintains to work properly; when the voltage of the input end 7 of the DC-DC power supply drops to the minimum working voltage $V_{inmin}$ of the DC-DC power supply, the voltage of the output end 9 of the DC-DC power supply also drops therewith, at the moment the voltage stabilizing diode 1 is turned off, allowing the first triode 5 to be turned off and the second triode 6 to be turned on, at the moment the voltage of the enable end 8 of the DC-DC power supply is equal to component voltages of the first resistor 2 and the second resistor 3, the turn-on voltage of the enable end 8 is boosted, since the resistance values of the first resistor 2 and the second resistor 3 meet the first formula, the voltage of the enable end 8 of the DC-DC power supply is less than the turn-on voltage of the enable end 8, and thus the DC-DC power supply is turned off. Only when the voltage of the input end 7 of the DC-DC power supply surges to the normal working voltage of the DC-DC power supply can the voltage of the enable end 8 be larger than the turn-on voltage of the enable end 8 and then can the DC-DC power supply be turned on again. In this way, frequent turn-on and turn-off of the DC-DC power supply may be avoidable.

As can be seen from the above, in the present disclosure, a voltage stabilizing diode, resistors and triodes are employed to construct a DC-DC power supply control circuit, and an input voltage of an enable end of a DC-DC power supply is changed through turn-on or turn-off of the triodes. In this way, a low-voltage automatic switch-off protection of the DC-DC power supply is achieved, thereby solving a problem of repeated turn-on or turn-off of the DC-DC power supply caused by fluctuation of the input voltage of the DC-DC power supply in the vicinity of a minimum working voltage of the DC-DC power supply.

Embodiment II

Figure 2:
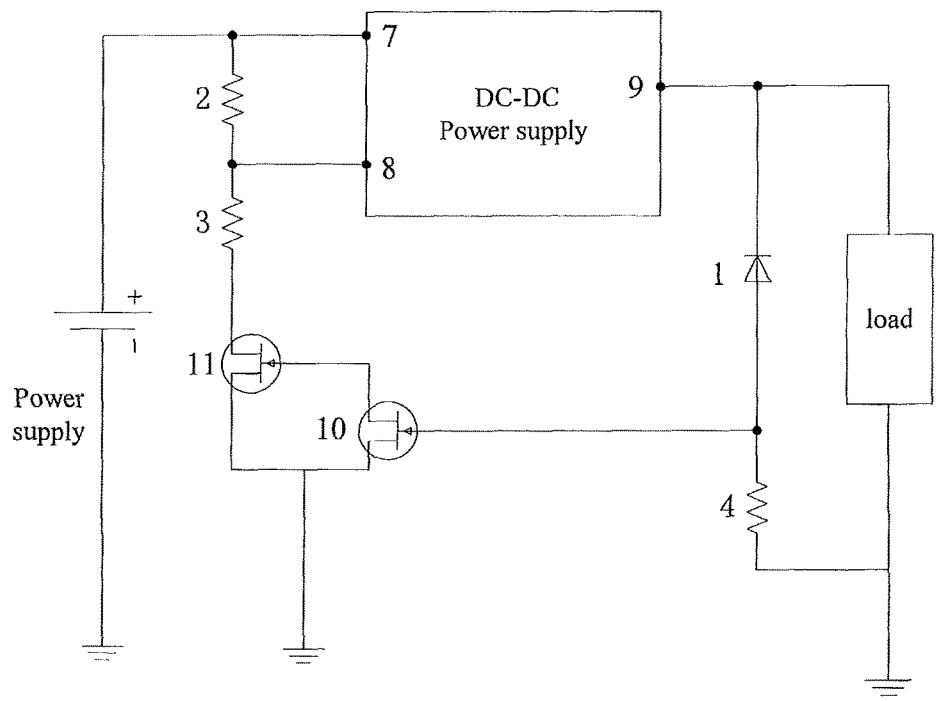
FIG. 2 is a schematic structural diagram of a DC-DC power supply control circuit according to another embodiment of the present disclosure.

The embodiment of the present disclosure provides a DC-DC power supply control circuit, referring to FIG. 2, the DC-DC power supply control circuit in the embodiment of the present disclosure includes:

a voltage stabilizing diode 1, a first resistor 2, a second resistor 3, a third resistor 4, a first field effect transistor 10 and a second field effect transistor 11; where one end of the first resistor 2 is connected with an input end 7 of the DC-DC power supply, and another end of the first resistor 2 is connected with an enable end 8 of the DC-DC power supply;

one end of the second resistor 3 is connected with the enable end 8 of the DC-DC power supply, and another end of the second resistor 3 is connected with a drain electrode of the second field effect transistor 11;

a gate electrode of the second field effect transistor 11 is connected with a drain electrode of the first field effect transistor 10, and a source electrode of the second field effect transistor 11 is grounded;

a negative electrode end of the voltage stabilizing diode 1 is connected with an output end 9 of the DC-DC power supply, and a positive electrode end of the voltage stabilizing diode 1 is connected with a gate electrode of the first field effect transistor 10;

one end of the third resistor 4 is connected with the gate electrode of the first field effect transistor 10, and another end of the third resistor 4 is grounded;

a source electrode of the first field effect transistor 10 is grounded; and resistance values of the first resistor 2 and the second resistor 3 meet following conditions:

$$V_{inmin} * \left(\frac{R_2}{R_1 + R_2}\right) \leq V_{en}$$

(described as a first formula hereinafter for the convenience of description); and $$V_{innormal} * \left(\frac{R_2}{R_1 + R_2}\right) \geq V_{en}$$

(described as a second formula hereinafter for the convenience of description); where $V_{inmin}$ denotes a minimum working voltage of the DC-DC power supply, $V_{innormal}$ denotes a normal working voltage of the DC-DC power supply, $V_{en}$ denotes a turn-on voltage of the enable end 8 of the DC-DC power supply, $R_1$ denotes a resistance value of the first resistor 2, and $R_2$ denotes a resistance value of the second resistor 3.

As shown in FIG. 2, a power supply is connected with the input end 7 of the DC-DC power supply to supply an input voltage for the DC-DC power supply, and a load is connected with the output end 9 of the DC-DC power supply so that the load is power-supplied by the DC-DC power supply.

Optionally, the first resistor 2 and the second resistor 3 specifically are slide rheostats. Of course, the first resistor 2 and the second resistor 3 also may be resistors having fixed resistance values meeting the first formula and the second formula, which are not limited herein.

Optionally, a resistance range of the third resistor is 10 Ohms~10,000 Ohms. Specifically, the resistance value of the third resistor also may be set up according to the actual situation, which is not limited herein.

Optionally, the model of the DC-DC power supply in the embodiment of the present disclosure specifically is MP2315. Of course, the DC-DC power supply control circuit in the embodiment of the present disclosure may also be applied to other DC-DC power supplies having enable ends, which is not limited herein.

A concrete implementation process of the DC-DC power supply control circuit in the embodiment of the present disclosure is described with reference to FIG. 2 as below: when the voltage of the output end 9 of the DC-DC power supply is normal, the voltage stabilizing diode 1 is turned on, allowing the first field effect transistor 10 to be turned on and the second field effect transistor 11 to be turned off, at the moment the voltage of the enable end 8 of the DC-DC power supply is equal to that of the input end 7 of the DC-DC power supply, and the DC-DC power supply maintains to work properly; when the voltage of the input end 7 of the DC-DC power supply drops to the minimum working voltage $V_{inmin}$ of the DC-DC power supply, the voltage of the output end 9 of the DC-DC power supply also drops therewith, at the moment the voltage stabilizing diode 1 is turned off, allowing the first field effect transistor 10 to be turned off and the second field effect transistor 11 to be turned on, at the moment the voltage of the enable end 8 of the DC-DC power supply is equal to component voltages of the first resistor 2 and the second resistor 3, the turn-on voltage of the enable end 8 is boosted, since the resistance values of the first resistor 2 and the second resistor 3 meet the first formula, the voltage of the enable end 8 of the DC-DC power supply is less than the turn-on voltage of the enable end 8, and thus the DC-DC power supply is turned off. Only when the voltage of the input end 7 of the DC-DC power supply surges to the normal working voltage of the DC-DC power supply can the voltage of the enable end 8 be larger than the turn-on voltage of the enable end 8 and then can the DC-DC power supply be turned on again. In this way, frequent turn-on and turn-off of the DC-DC power supply may be avoidable.

As can be seen from the above, in the present disclosure, a voltage stabilizing diode, resistors and field effect transistors are employed to construct a DC-DC power supply control circuit, and an input voltage of an enable end of a DC-DC power supply is changed through protection of the DC-DC power supply is achieved, thereby solving a problem of repeated turn-on or turn-off of the DC-DC power supply caused by fluctuation of the input voltage of the DC-DC power supply in the vicinity of a minimum working voltage of the DC-DC power supply.

Embodiment III

The embodiment of the present disclosure provides an electronic device, which includes the DC-DC power supply control circuit as described in Embodiment I or Embodiment II.

Specifically, the electronic device in the embodiment of the present disclosure may be a mobile phone, a tablet computer, a palm computer or other electronic devices using a DC-DC power supply to supply power, which is not limited herein.

In the foregoing embodiments, description of various embodiments may be focused on differentially, and reference may be made to related descriptions of other embodiments for a part not expatiated in a certain embodiment. The above is a description of a DC-DC power supply control circuit and an electronic device provided by the present disclosure, those of ordinary skill in the art may change specific embodiments and application scopes thereof in accordance with ideas of the embodiments of the present disclosure. For example, on a basis of Embodiment I and Embodiment II, in the embodiments of the present disclosure, other types of transistors may also be employed to replace the triodes in Embodiment I or the field effect transistors in Embodiment II. In conclusion, this specification should not be construed as limiting the present disclosure.

What is claimed is:

1. A DC-DC power supply control circuit, comprising:
a voltage stabilizing diode, a first resistor, a second resistor, a third resistor, a first triode and a second triode; wherein
an end of the first resistor is connected with an input end of the DC-DC power supply, and another end of the first resistor is connected with an enable end of the DC-DC power supply;
an end of the second resistor is connected with the enable end of the DC-DC power supply, and another end of the second resistor is connected with a collector of the second triode;
a base electrode of the second triode is connected with a collector of the first triode, and an emitting electrode of the second triode is grounded;
a negative electrode end of the voltage stabilizing diode is connected with an output end of the DC-DC power supply, and a positive electrode end of the voltage stabilizing diode is connected with a base electrode of the first triode;
an end of the third resistor is connected with the base electrode of the first triode, and another end of the third resistor is grounded;
an emitting electrode of the first triode is grounded; and
resistance values of the first resistor and the second resistor meet following conditions:

$$V_{inmin} * \left(\frac{R_2}{R_1 + R_2}\right) \leq V_{en};$$

and $$V_{innormal} * \left(\frac{R_2}{R_1 + R_2}\right) \geq V_{en};$$

wherein
$V_{inmin}$ denotes a minimum working voltage of the DC-DC power supply, $V_{innormal}$ denotes a normal working voltage of the DC-DC power supply, $V_{en}$ denotes a turn-on voltage of the enable end of the DC-DC power supply, $R_1$ denotes a resistance value of the first resistor, and $R_2$ denotes a resistance value of the second resistor.

2. The DC-DC power supply control circuit according to claim 1, wherein
the first resistor and the second resistor specifically are slide rheostats.

3. The DC-DC power supply control circuit according to claim 1, wherein the first resistor and the second resistor specifically are resistors having fixed resistance values.

4. An electronic device, comprising a load and the DC-DC power supply control circuit according to claim 1.

5. A DC-DC power supply control circuit, comprising:
a voltage stabilizing diode, a first resistor, a second resistor, a third resistor, a first field effect transistor and a second field effect transistor; wherein
an end of the first resistor is connected with an input end of the DC-DC power supply, and another end of the first resistor is connected with an enable end of the DC-DC power supply;
an end of the second resistor is connected with the enable end of the DC-DC power supply, and another end of the second resistor is connected with a drain electrode of the second field effect transistor;
a gate electrode of the second field effect transistor is connected with a drain electrode of the first field effect transistor, and a source electrode of the second field effect transistor is grounded;
a negative electrode end of the voltage stabilizing diode is connected with an output end of the DC-DC power supply, and a positive electrode end of the voltage stabilizing diode is connected with a gate electrode of the first field effect transistor;
an end of the third resistor is connected with the gate electrode of the first field effect transistor, and another end of the third resistor is grounded;
a source electrode of the first field effect transistor is grounded; and
resistance values of the first resistor and the second resistor meet following conditions:

$$V_{inmin} * \left(\frac{R_2}{R_1 + R_2}\right) \le V_{en};$$

and $$V_{innormal} * \left(\frac{R_2}{R_1 + R_2}\right) \ge V_{en};$$

wherein
$V_{inmin}$ denotes a minimum working voltage of the DC-DC power supply, $V_{innormal}$ denotes a normal working voltage of the DC-DC power supply, $V_{en}$ denotes a turn-on voltage of the enable end of the DC-DC power supply, $R_1$ denotes a resistance value of the first resistor, and $R_2$ denotes a resistance value of the second resistor.

6. The DC-DC power supply control circuit according to claim 5, wherein
the first resistor and the second resistor specifically are slide rheostats.

7. The DC-DC power supply control circuit according to claim 5, wherein the first resistor and the second resistor specifically are resistors having fixed resistance values.

8. An electronic device, comprising a load and the DC-DC power supply control circuit according to claim 5.

* * * * *